Patented Sept. 29, 1942

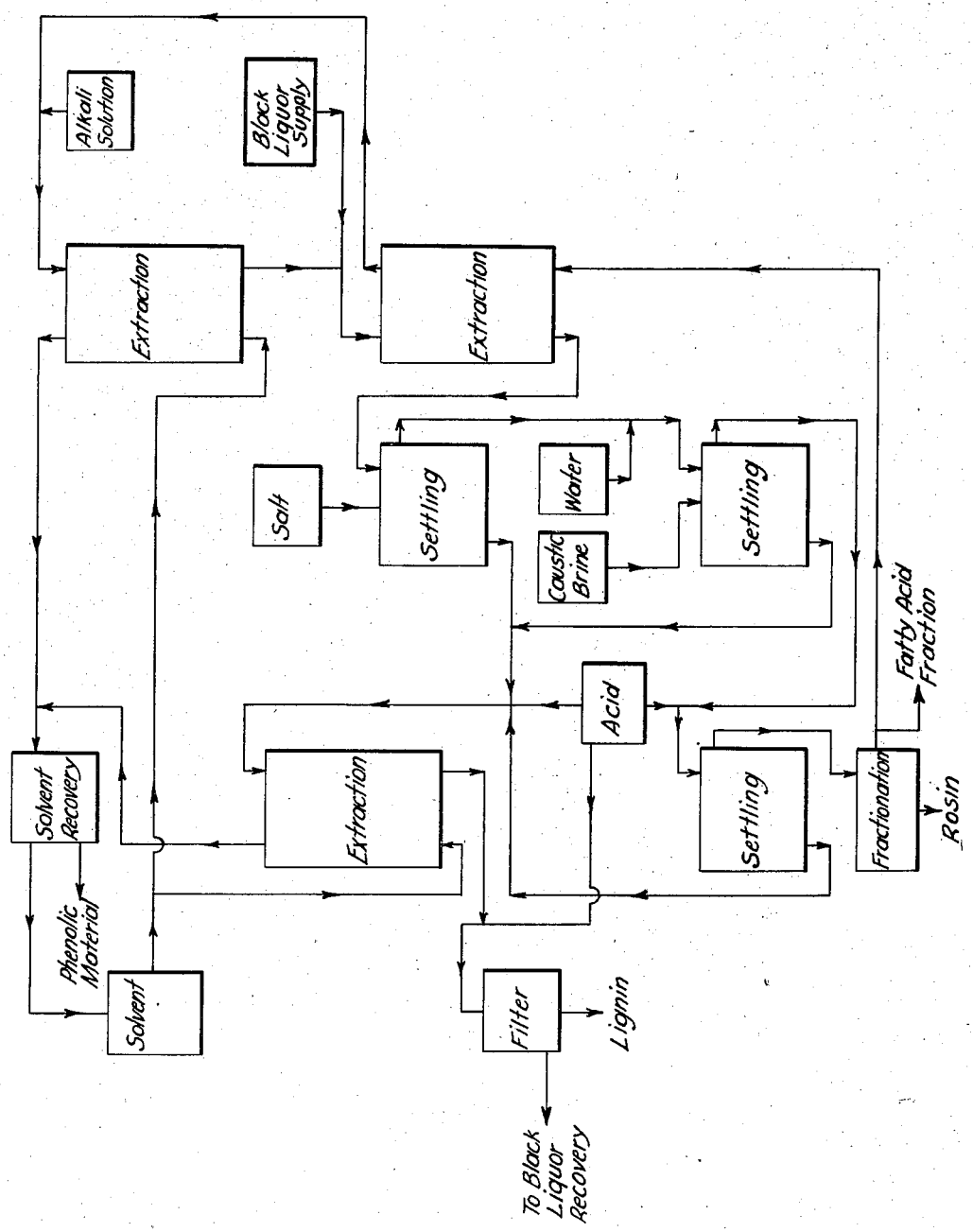

2,296,952

UNITED STATES PATENT OFFICE 2,296,952

CHEMICAL TREATMENT OF BLACK LIQUOR AND TALL OIL

John Ross and Joseph Henry Percy, New York, N. Y., assignors to Colgate-Palmolive-Peet Company, Jersey City, N. J., a corporation of Delaware Application December 30, 1939, Serial No. 311,822

12 Claims. (Cl. 260—97.5)

The present invention is directed to the novel purification of the organic acid by-products obtained in the manufacture of paper pulp from wood and to the recovery of other valuable by-products therefrom.

The organic acid by-product obtained in the alkaline processing of wood for paper pulp manufacture is a dark-colored, strong-smelling material, commonly termed tall oil. It not only possesses an objectionable dark color as originally obtained but on aging it darkens further. Methods have been suggested for preparing stable light-colored materials from tall oil, but in general the cost involved is relatively high for the type product obtained.

It has now been discovered that it is possible to improve the color and odor of tall oil as well as its color stability by a relatively simple, economical procedure. It has also been found possible to recover phenolic type compounds from the products of the alkaline processing of wood. It has further been discovered that methylated phenols of the vanillin type may be obtained from the liquors of sulphate or soda processes of wood pulp manufacture.

Black liquor, from which tall oil is obtained, is an aqueous solution separated from the cellulosic portions of wood in the manufacture of paper pulp by alkaline processes and it usually contains, among other things, sodium sulphate, sodium sulphide, sodium phenates, sodium salts of lignin material, fatty acid soaps, resin soaps and unsaponifiable organic compounds. When this black liquor is concentrated to recover the soda, a large proportion of the soap will separate and float on the liquor as a greyish-green mass which blackens rapidly on exposure to air. The unsaponifiable material in the black liquor to a large extent separates out with this floating soap. The lignin-like material and the phenolic substances of the liquor partition between the sulphate brine and the floating soap. Upon acidification of the soap with acid or acid gases, such as sulphuric acid and/or sulphur dioxide, an organic acid product known as tall oil is obtained. Both the floating soap and the tall oil so obtained are sensitive to oxidation with consequent blackening. It has now been found that this is apparently due to the oxidation of complex phenolic substances which are retained in the soap and acid products. This has further been found to be the major cause of darkening of the tall oil on aging.

By the present invention it is now possible to remove substantially completely the phenolic and lignin-like materials from the tall oil soap and to recover them as valuable by-products. The resulting tall oil or its soap products, which are of a light brown color and do not darken on standing, are stable and in a much better condition for other treatments, particularly those which require application of heat and exposure to oxidizing conditions.

The new process generally comprises the treatment, preferably under non-oxidizing conditions, of the soaps of the carboxylic acids separated from wood, with a substantially immiscible aqueous alkaline salt solution so as to separate the phenolic and lignin-like substances from the soaps of the acids. It is also a feature of the invention to blow the mixture with steam or other inert gas to volatilize the unsaponifiable, lower boiling, odoriferous materials, before, during or after the alkaline brine extraction. The blowing advantageously may accompany the brine treatment in order to obtain thorough agitation and washing of the tall oil soap with the brine solution. Steam agitation likewise heats the soap, reduces its viscosity and increases the solubility of the impurities in the extracting solution. The presence of the inorganic salts and/or base during the blowing operation also serves to open the soap. Without these inorganic materials being present the soap is tough and plastic, thus preventing substantial removal of the volatile impurities.

One method of operation includes adding to the black liquor, before concentration, more concentrated sulphate brine or dry salts, for example from a previously concentrated black liquor brine, in order to cause the splitting out of the soap in the presence of a larger quantity of washing brine. This avoids extended heat treatment of the organic acid soaps under conditions which may cause the formation of discolored products. This mixed solution may then be agitated mechanically and/or with steam to cause thorough washing and separating of the soap, thereby removing as much brine-soluble material, including lignin and phenol salts, as possible. After settling, the soaps of the carboxylic acid may then be separated from the brine by drawing off the brine, by decanting, or by centrifuging, thinned with water again, and washed with a fresh alkaline brine of sodium sulphate and/or sodium chloride. The carboxylic acid soaps in the presence of alkali and/or inorganic salts may be blown with steam or other inert gas before, during and/or after the brine-washing step. It is important in the production of light-colored products and in the substantial recovery of the phenolic and lignin materials that the black liquor, floating soap, and the tall oil be kept from contact with the air or oxidizing conditions as much as possible, especially in a heated condition. After the treatment of the soap with the alkaline brine and with steam, it is light-colored and improved in odor. When acidified the organic acid product is clear, lighter, and substantially free from precipitated lignin materials. As a consequence, it is completely soluble in gasoline, kerosene, petroleum ether and similar solvents.

The brine solutions may be acidified, for example with sufficient sulphuric acid, hydrochloric acid, carbon dioxide and/or sulphur dioxide, to split the phenolic salts and to cause the lignin-like material to come out of solution. The insoluble solid material may be separated by decanting, filtering and/or centrifuging. The acidified brine solutions may then be steam distilled and/or solvent extracted, for example with ethyl ether, butyl alcohol, gasoline or petroleum ether, to remove the phenolic and lignin material. These latter substances may be used in the preparation of flavors, perfumes, and the like. The sulphate brines may again be neutralized and calcined for reuse in the sulphate process of wood pulp manufacture.

Another feature of the present invention is to extract a neutral or alkaline aqueous solution of tall oil soap, e. g. black liquor, with a liquid high molecular weight material of the class consisting of liquid high molecular weight fatty acids having at least eight carbon atoms and esters thereof, including crude or purified tall oil fatty acids, fatty oils such as olive oil, oleic acid, caprylic acid, coconut oil, and/or the like, with or without other solvents such as gasoline, ether, or the like, by batch or continuous countercurrent methods. In this manner it is possible to remove unsaponifiable and phenolic substances from the soap solution. The excess alkali of the aqueous solution of tall oil soaps preferably should be as alkali carbonate when phenolic substances are to be removed therefrom by the organic acids since such carbonates do not exercise the solubilizing effect on the phenols in the soap solution that caustic alkalies do. By employing extractants of the above type, no contamination of the product is obtained and the unrecovered extractant is regained as part of the desired product. As an alternative procedure, the tall oil soap solution may be fractionally acidified, thus forming the extracting oil in situ or tall oil may be fractionally extracted with an aqueous solution of caustic alkali and/or alkali carbonate, preferably the latter.

This extraction may be conducted either before or after the caustic alkaline brine washing of the tall oil soaps and likewise should be performed under non-oxidizing conditions.

The accompanying drawing sets forth a flow sheet for a satisfactory method of treating black liquor according to the principles of this invention.

The tall oil or its soap, after one or more of these novel treatments, is particularly suited for further purification or separation treatments. For example, the tall oil in the form of its soap, after the pretreatment, may be subjected to a properly regulated heat treatment, at relatively high temperatures, while passing a strong current of steam or inert gas through it, advantageously under reduced pressure, in the substantial absence of air and liquid water. This high temperature steam treatment of the anhydrous soaps removes the unsaponifiable material from the saponified mass, and apparently radically changes and materially improves the characteristics of the saponified material. The treatment may be carried out at various temperatures, preferably ranging from about 200° C. to about 350° C. In this temperature range, the substantially anhydrous liquid resin soap is in a freely fluid form, such that the steam which is passed through it thoroughly agitates it, insuring uniformity of temperature throughout the mass and preventing any portions of the mass from being overheated and subjected to decomposition. The strong current of steam which is used serves not only to agitate the liquid mass, but also to assist in the vaporization of the unsaponifiable materials which are distilled off and to blanket the mass and exclude air to prevent oxidation at the high temperatures used. The product so obtained is free from objectionable odor and is substantially free from unsaponifiable material, it forms a harder soap when grained, and the acids which may be liberated from it have a higher viscosity and a lower iodine number, indicating a change in the position of the unsaturated groups or a higher degree of saturation. That this high temperature process can be successfully applied to liquid resin (tall oil) or its saponified product is unexpected, because ordinary resin, when treated in the same manner, does not liquefy, but usually decomposes due to local overheating. The previous removal of phenolic materials by the process of this invention permits the high temperature treatment of the tall oil soaps without alteration of the color thereof.

The tall oil and alkali may be used and the soap formed in situ or the tall oil may be used in saponified form. One way to carry out the treatment is to maintain a body of some of the soap material at the relatively high temperature of 200° to 350° C., at which it is thinly fluid, and to add the rest of the material at a rate not substantially greater than the rate at which it may be heated to the temperature necessary for fluidity, and to operate the process with continuous or successive additions of crude material and withdrawals of treated material. For example, tall oil and alkali or tall oil soap, with water, may be raised to an elevated temperature under pressure and then be flashed into the chamber containing the anhydrous soap under treatment.

If the lower temperatures, in the neighborhood of 200° to 250° C., are used for the treatment, a longer time of treatment is generally required to permit the substantially complete separation of the unsaponifiable constituents. The time required for this separation will vary both with the temperature of the treatment, the pressure maintained within the vessel, and the amount of steam used. It will also vary somewhat with the particular liquid resin treated, as some liquid resins contain more unsaponifiable material, or less volatile unsaponifiable material, than other liquid resins. In general, the rapidity of separation of unsaponifiable material is greater at higher temperatures, at higher vacua, and with injection of greater quantities of steam. Another factor which influences the selection of proper periods and temperatures for treatment is that the desirable changes in the characteristics of the various products, for example, the lowering of the iodine values of the resin and fatty acids, are more rapid and greater at higher temperatures, for example, 300–325° C., than at lower temperatures, for example 225–250° C. In general, temperatures of 250° to 300° C. are preferred, particularly when it is not desired to materially change the properties of the fatty acids. In some cases, however, temperatures in excess of 350° C. may be used.

Various alkaline materials may be used for the saponification, including caustic alkalies (caustic soda or potash), lime, carbonated alkalies (soda ash or potassium carbonate), limestone, marble dust, magnesium carbonate, dolomite, etc., or mixtures thereof. Soda ash is preferred because it is cheap, effective, and produces a directly usable sodium soap. It may be necessary to change the temperatures used if other alkaline materials than caustic soda or soda ash are used, because of the differences in the melting points of the soaps formed with metals other than sodium. In any event, the temperature must be sufficiently high to insure the necessary fluidity. The previous removal of complex phenols and lignin material from the tall oil soaps prevents the finished soap from being discolored by the high temperature decomposition products of these materials. The hot anhydrous soap may be cooled on rolls to form a flake or be sprayed with or without water in a suitable tower in the substantial absence of free oxygen to yield a grain or bead. The hot anhydrous soap may be added to water or soap solution in order to obtain a neat soap.

Although it is not essential, it is also possible to dissolve the caustic alkaline brine-washed tall oil in gasoline and to treat this solution with furfural, amphoteric metal halides such as stannic chloride, or with similar materials to remove additional viscous, resinous and/or color bodies. The tall oil may be lightened in color by distillation, or by treatment with hydrogen at any time during the treatment of the tall oil in order to improve the final products. When a crude, dark, undistilled product is treated, it may be desirable, after the alkali-steam treatment of this invention, to split the soap and distill the acids to improve their color. If a light-colored raw material is used, such distillation after treatment is not generally necessary, and the anhydrous soaps produced may simply be hydrated and used as such or in admixture with other soaps, or otherwise treated.

It is often desired to substantially separate the tall oil into its constituents, thus recovering the fatty acids, the resin acids, phenolic bodies, and the sterol-like bodies in individual fractions, because these materials, so separated, are far more valuable and have greater utility than the various mixtures thereof. The separated fatty acids can be used for preparing high grade soap or even edible products. The rosin acids can be used in resin, adhesive and coating compositions, as well as for laundry soaps. The sterol-like bodies can be used in preparing various synthetic chemical compositions such as wetting agents and detergents in the form of the salts of their sulphuric and phosphoric acid derivatives. The phenolic bodies can be used for chemical preparation of materials, such as perfumes, flavors, medicines and synthetic resins.

The separation of the acid ingredients is best effected by fractional distillation of the acids from the tall oil soaps which have been treated in the anhydrous state at an elevated temperature in the presence of steam in order to first remove the non-saponifiable materials substantially consisting of sterol-like bodies, the phenols having previously been removed by the novel alkaline brine wash previously described. The absence of the phenols and the non-saponifiables which have a very broad boiling range renders the separation of the fatty acids by distillation more efficient. The material, however, may be fractionally distilled in order to separate the acidic constituents into fatty acids and resin acids and then the anhydrous soaps thereof may be treated to separate the non-saponifiables, or the process may include fractional distillation of the acids and their fractions before and after the heat treatment of the anhydrous soaps of said acids. The material may likewise be fractionated by fractional crystallization from acetone or similar solvents, preferably after the removal of non-saponifiables.

The fractional distillation may be carried out by any standard procedure and is preferably conducted by taking the high temperature-steam treated, pretreated soap, acidifying to obtain the organic acids, and washing the acids free from soluble extraneous matter. The dried washed acids are then ready for fractionation, which is advantageously carried out by first rapidly heating the material in a suitable heater, such as a pipe still. The temperature of the heater is preferably controlled so as to raise the temperature of the acids as they pass therethrough to substantially 250° to 300° C. as rapidly as possible within several minutes. Steam, preferably superheated, may be added to the acids during the heating process in order to assist in the subsequent vaporization. Thermal decomposition is substantially prevented by application of the heat for only the short period required to reach the fractionation temperature by means of a pipe still.

The acid vapors issuing from the heater at a temperature of about 250° to 300° C. pass into a flash chamber preferably at a reduced pressure of about 5–10 mm. In this apparatus the unvolatilized portion, mainly resinous material, is separated from the volatilized portion and drops to the bottom of the flash chamber. Steam superheated to the heater outlet temperature is passed into the bottom of the flash chamber for stripping purposes. A number of plates may be included below the heater vapor outlet so as to more effectively strip the bottoms of resinous materials. The resin acid materials may be withdrawn from the bottom of the flash chamber. Baffles are placed at the top of the flash chamber to remove entrained unvaporized materials from the fatty acid vapors.

A number of fractionating systems are possible but a series of individual fractionating columns is preferred because the boiling points of some of the fatty acids that are to be separated lie very close together and this distillation scheme is found preferable. The number of columns required is equal to the number of cuts desired less one.

Thus the vapors issuing from the flash chamber are passed into a bubble-plate column supplied with superheated bottom stripping steam. In this column bottoms are removed and an overhead cut is removed. Reflux is supplied by means of a partial condenser located at the top of the column. The cooling medium for this condenser may be charging stock already raised in temperature by passage through the partial condensers connected with the succeeding columns that are operated at successively lower temperatures. In this manner the overall thermal efficiency may be greatly increased. The stripped bottoms discharged from this column are considered resin acids and are free from the mixture of fatty acids comprising the overhead from this column. In the succeeding column the now resin-free mixture of fatty acids is separated. By proper control of the individual reflux ratios and bottom steam ratio, taking also into consideration the effectiveness of the column, it is possible to cut the mixture of fatty acids into very narrow boiling fractions.

An alternate procedure is to separate the mixture by passing the vapors issuing from the flash chamber into a bubble-plate fractionating tower. The fatty acid vapors, entering the fractionating tower which maintains a suitable reflux, may be separated by reason of their different boiling points into relatively pure fractions of fatty acids. The hot liquid acids may be drawn from various plates in the tower which contain the largest percentage of individual fatty acids and are passed into individual reboilers. Steam superheated to the proper temperature is passed into the bottom of the reboiler where the feed is stripped of the more volatile portions, which vapors are returned to the column. The liquid withdrawn from the stripper may be a fairly pure fatty acid, e. g. palmitic acid, but it generally will be found to contain a certain amount of other fatty acids. A more complete separation, of course, may be obtained upon further fractionation. The liquid drawn from the bottom of this fractionating column consists primarily of relatively pure resin acids. In order to facilitate fractionation a current of steam is passed into the column from an open steam coil positioned in the bottom of the fractionating column. From the upper bubble-plate of the fractionating column the vapors, consisting principally of steam and a fatty acid, pass through a reflux condenser which furnishes sufficient reflux for the desired fractionation.

In either method of fractionating the non-condensed vapors pass through a line into a vapor condenser wherein the temperature is so regulated that practically all of the fatty acid vapors are liquefied and the steam is left in the vapor state. The fatty acid liquefied in the condenser is substantially pure. Any fatty acids in the steam are removed by passing the steam around suitable baffles whereby the particles of fatty acid are removed. The steam freed from its suspended fatty acids is preferably passed directly to a barometric condenser to which are connected suitable vacuum pumps or steam jets which serve to maintain the entire system under a suitable reduced pressure. If desired, portions of certain of the fatty acid fractions may be returned to the feed to raise the vapor pressure of the original mixture.

It should also be noted in the fractional distillation procedures that although it is preferred to flash into the flash chamber, in some instances it may be desirable to flash the acids directly into the fractionating tower. It is also possible to conduct the distillation with additional materials such as aliphatic, alicyclic, terpene and aromatic hydrocarbons, fatty acids, and the like. The process may be conducted in a continuous manner or it may be carried out in a batch procedure.

Although this description is directed to the fractional distillation of the acids freed from the non-saponifiable sterol-like material, the process is not so limited and the fractional distillation may be similarly applied to the tall oil before the steam treatment of the anhydrous soaps of tall oil or before and after such treatment. It is also possible, in order to effect separation of the resin acids from the fatty acids, to esterify the fatty acids in the presence of inorganic acids such as sulphuric acid or hydrochloric acid with one or more alcohols such as methyl alcohol, ethyl alcohol and butyl alcohols. The esters of the fatty acids differ appreciably in chemical and physical properties from the rosin acids and hence may be more readily separated therefrom than the original fatty acids. The separation is preferably by fractional distillation, as described above, but solvent extraction and like methods may be employed, either before and/or after the removal of the non-saponifiables from the corresponding soaps. One method involves the solution of the mixture of fatty acid esters and rosin acids in a solvent such as ether and the extraction of the rosin acids therefrom with an aqueous alkaline solution.

The invention will be further illustrated by the following specific examples, although it is not limited thereto.

*Example I*

One thousand (1,000) parts by weight of crude tall oil soap are mixed with 50 parts by volume of a 50° Bé. aqueous caustic soda solution and blown with steam. After boiling for several hours the soap is grained out by the addition of a concentrated aqueous sodium chloride brine. The salted-out soap is settled about 8 hours on a steam bath and is separated from the lye by filtration. The soap is dissolved in water, and again salted out at boiling temperature with a caustic alkaline sodium chloride brine while blowing with steam. The salted-out soap is again settled for about 8 hours and separated from the second lye. The procedure is repeated a third time. The soap obtained has a good odor, is tan in color, and does not darken on exposure to air. The three alkaline sodium chloride lyes are brought to a pH of about 8–8.5 with carbon dioxide. The brine solutions are then extracted with ethyl ether to separate phenols, after which the water- and ether-insoluble materials, about 11.5 parts by weight, are filtered therefrom. The brine solutions are then acidified and extracted with ether to recover carboxylic acids retained therein. The aqueous solution is then steam distilled to recover vanillin-like bodies therefrom. The soluble phenolic materials are redissolved in dilute sodium hydroxide and extracted with ether to separate neutral oils from the phenolic substances. This phenolic solution is again acidified and the phenols recovered therefrom. These phenols have a boiling range of about 68° to 260° C. at 3 mm. pressure. The relatively ether-insoluble solid material is dissolved in about 115 parts by volume of water and about 30 parts by weight of sodium hydroxide and refluxed for about six hours. The solution is acidified by saturating with sulphur dioxide to a pH of less than 5.5. It is then filtered and the filtrate is treated with sulphuric acid while refluxing and blowing with air. A vanillin type product is recovered from the filtrate by steam distillation of the aqueous mixture.

Example II

Fresh black liquor from wood pulp manufacture is partially acidified with tall oil acids to a pH of about 8. The liquor is then extracted with additional tall oil to remove unsaponifiable and phenolic bodies. This is preferably accomplished by a single operation of countercurrent extraction of the black liquor with tall oil. The black liquor is then concentrated while blowing steam therethrough until the floating soap splits out. The steam is passed through a condenser to recover volatilized organic bodies contained therein. That sodium sulphate which is to be added for make-up in the sulphate process of pulp manufacture is now added to the black liquor to cause more effective splitting out of the soap. The floating soap is removed and treated by the process of Example I. The black liquor is acidified and extracted with petroleum ether to remove organic materials therefrom. Insoluble solid materials are also separated from the acidified black liquor by filtration. The petroleum ether-soluble organic materials are fractionally separated by mixing them with an alkali solution and then extracting this alkaline mixture with ethyl ether to remove the neutral oils and unsaponifiables from the aqueous solution of alkali-soluble material. The aqueous alkaline solution is then acidified to a pH of about 8 to 8.5 and again extracted with ether to recover phenolic bodies. The fatty acids are recovered by acidifying the remaining solution. The aqueous solution is steam distilled to recover vanillin-like bodies. The insoluble lignin-like material is treated as in Example I to recover vanillin. The tall oil extract is neutralized with sodium carbonate solution and extracted with ether to recover the phenols and unsaponifiables contained therein. The tall oil soap may then be added to fresh black liquor to be treated. The phenols and unsaponifiables may be separated along with the ether-soluble material obtained from the acidified black liquor.

It is possible to add other organic acid materials to the liquid resin at any point during the process. For example, various oils, fats, waxes and resins may be added to the tall oil or crude resin before any processing has been effected to remove various impurities which they may contain. Suitable addition agents are wool fat, certain grades of garbage grease, whale oil and fish oils, spermaceti, tallow, coconut oil, olive oil, various grades of wood and gum rosin, cottonseed oil, cottonseed foots, linseed oil, China wood oil, soya bean oil, palm oil, naphthenic acids, montan wax, carnauba wax, Japan wax, Chinese wax, as well as the various individual fatty or resin acids thereof or mixtures of any of these fats, oils, waxes, resins and acids.

The new soap compositions may be used in combination with any of the common auxiliary agents used in soap and detergent compositions. Suitable addition agents are other emulsifying agents including long-chain alcohol sulphate salts, monoglyceride monosulphate salts, salts of sulphonated mineral oil extracts, Turkey red oil, lecithin, ethanolamine soaps; alkaline soap builders such as borax, soda ash, trisodium phosphate, and sodium silicate; the water-soluble, water-softening phosphorus compounds of the type of tetraphosphoric, pyrophosphoric or hexametaphosphoric acid and their alkali metal, ammonia, and certain amine salts or alkyl esters; methyl and ethyl cellulose; coloring matter such as dyes, lakes, pigments; abrasives and fillers such as silica, pumice, feldspar, precipitated chalk, infusorial earth, bentonite, talc, starch, and air; liquids including carbon tetrachloride, perchlorethylene, trichlorethylene, glycerine, ethyl alcohol, glycol, tetrahydrofurfuryl alcohol, phenol, cyclohexanol, water, tetralin, decalin, pine oil, mineral oil, mineral oil extracts, and naphtha; perfumes and deodorants; fats, oils, fatty acids, monoglycerides, waxes, gums, glue and resins; germicides, such as phenol and organic or inorganic mercury compounds; any of the common water-soluble alkali metal or ammonium salts, and various mixtures thereof. The type of addition agent to be used will depend, of course, on the ultimate use of the new soap composition. The various ingredients may be mixed with the soap by any of the common methods such as milling, stirring, kneading, crutching, fusing, and drying of mixed solutions.

Where, in this specification and the appended claims, reference is made to tall oil or liquid resin, it is understood that it refers to that product which is obtained as a by-product from the processing of wood to produce paper pulp which product consists of a mixture of resin-like acids, fatty acids, unsaponifiable material and impurities, whether produced by the sulphate, sulphite, soda or other processes, and whether distilled or not; and where reference is made to saponified liquid resin, it is understood that it is to such a product in saponified form, whether obtained by saponifying liquid resin, or in the crude form which is directly separated from the liquors of the paper making process without acidification to produce the liquid resin.

It will thus be seen that by the present invention there is provided a process for the production of soaps and soap-like detergents of commercially satisfactory qualities from the products obtained as the by-products from the alkaline processes for the production of paper pulp and also as new products, the improved soaps or soap-like detergents and improved unsaponifiable products.

As many widely different embodiments of the invention may be made without departing from the spirit and scope thereof, it is to be understood that the application is not limited to the specific proportions or embodiments thereof except as defined in the following claims.

We claim:

1. The process of recovering by-products of black liquor which comprises partially acidifying and extracting the black liquor with tall oil to obtain a tall oil extract and an improved black liquor raffinate, and salting out the tall oil soaps from the black liquor raffinate in the presence of excess caustic alkali under non-oxidizing conditions.

2. The process of recovering by-products of black liquor which comprises extracting black liquor with tall oil under non-oxidizing conditions to obtain a purified black liquor and a tall oil extract containing organic non-carboxylic materials from the black liquor.

3. The process of improving tall oil which comprises extracting and partially neutralizing tall oil with an aqueous caustic alkaline solution under non-oxidizing conditions to obtain an aqueous solution of tall oil soap and a tall oil having the non-carboxylic constituents concentrated therein.

4. The process of improving tall oil which comprises extracting and partially neutralizing tall oil with an aqueous alkali carbonate solution under non-oxidizing conditions to obtain an aqueous solution of tall oil soap and a tall oil having the non-carboxylic constituents concentrated therein.

5. The process of improving tall oil which comprises extracting a hot aqueous soap of tall oil with a substantially immiscible caustic alkaline concentrated aqueous sodium chloride brine while blowing with steam under non-oxidizing conditions to obtain a purified tall oil soap solution and a caustic alkaline aqueous sodium chloride brine extract containing saponified non-carboxylic acid impurities from the original tall oil soap.

6. The process of improving tall oil which comprises extracting a hot aqueous soap of tall oil with a substantially immiscible caustic alkaline concentrated aqueous sodium chloride brine while blowing with an inert gas under non-oxidizing conditions to obtain a purified tall oil soap solution and a caustic alkaline aqueous sodium chloride brine extract containing saponified non-carboxylic acid impurities from the original tall oil soap.

7. The process of improving tall oil soap which comprises continuously countercurrently extracting black liquor with a liquid high molecular weight fatty material of the class consisting of liquid high molecular weight fatty acids having at least eight carbon atoms and esters thereof, under non-oxidizing conditions to recover phenolic and unsaponifiable materials therefrom.

8. The process of recovering by-products of black liquor which comprises partially acidifying and extracting the black liquor with a liquid high molecular weight fatty acid having at least eight carbon atoms to obtain a liquid high molecular weight fatty acid extract and a black liquor raffinate, reacting the liquid high molecular weight fatty acid extract with aqueous alkali carbonate solution to form an aqueous soap solution, extracting this aqueous soap solution with a water-immiscible solvent to obtain a substantially unsaponifiable-free aqueous soap solution and a solvent extract containing phenols and unsaponifiable organic materials, adding the unsaponifiable-free aqueous soap solution to fresh black liquor to undergo extraction, salting out the mixed soaps from the extracted black liquor under non-oxidizing conditions to obtain mixed soaps and a black liquor brine containing phenols and other non-carboxylic saponifiable organic materials, redissolving the mixed soaps and water, extracting this aqueous mixed soap solution while hot with a substantially immiscible caustic alkaline concentrated aqueous salt brine to obtain purified mixed soaps and a caustic alkaline brine containing phenols and other non-carboxylic saponifiable organic materials, acidifying the purified mixed soaps to obtain a high molecular weight fatty acid-containing material, returning a part of this high molecular weight fatty acid-containing material for extracting fresh black liquor containing added soap, adjusting the pH of the caustic alkaline salt brine and black liquor to about 8 to 8.5, extracting the brines with a water-immiscible solvent to obtain a solvent extract containing phenols and a phenol-free brine, acidifying the phenol-free brines, and filtering the acidified brines to recover lignin.

9. The process of separating lignin and phenols including thiophenols from tall oil soap which comprises extracting an aqueous solution of tall oil soap with a liquid high molecular weight fatty acid having at least eight carbon atoms to obtain an aqueous solution of an improved tall oil soap and a liquid high molecular weight fatty acid extract, and salting out the improved soap from the aqueous solution with a substantially immiscible caustic alkaline concentrated aqueous salt solution under substantially non-oxidizing conditions to yield a substantially lignin- and phenol-free tall oil soap.

10. The process of improving tall oil soaps which comprises extracting black liquor with a liquid high molecular weight material of the class consisting of liquid high molecular weight fatty acids having at least eight carbon atoms and esters thereof, under non-oxidizing conditions, to yield a purified black liquor raffinate and a liquid high molecular weight fatty extract containing organic impurities from the black liquor.

11. The process of removing by-products from tall oil which comprises extracting an aqueous tall oil soap solution with a liquid high molecular weight material of the class consisting of liquid high molecular weight fatty acids having at least eight carbon atoms and esters thereof, under non-oxidizing conditions, to obtain a purified aqueous tall oil soap solution and a liquid high molecular weight fatty extract containing organic non-carboxylic material from tall oil.

12. The process of recovering phenols from tall oil which comprises extracting, under substantially non-oxidizing conditions, a hot aqueous soap of tall oil with a substantially immiscible caustic alkaline concentrated aqueous salt solution to remove the phenolic materials therefrom, partially acidifying the resultant caustic alkali concentrated aqueous salt solution containing the phenolic materials, extracting the partially acidified aqueous solution with a water-immiscible solvent to remove the phenols, and separating the phenols from the solvent.

JOHN ROSS.
JOSEPH HENRY PERCY.